United States Patent
Haustein et al.

(10) Patent No.: US 12,184,386 B2
(45) Date of Patent: Dec. 31, 2024

(54) SPECULAR COMPONENT ESTIMATION IN A WIRELESS COMMUNICATION NETWORK

(71) Applicant: KONINKLIJKE PHILIPS N.V., Eindhoven (NL)

(72) Inventors: Thomas Haustein, Potsdam (DE); Lars Thiele, Berlin (DE); Wilhelm Keusgen, Berlin (DE); Marcus Grossmann, Friedrichroda (DE); Markus Landmann, Zeitz (DE)

(73) Assignee: Koninklijke Philips N.V., Eindhoven (NL)

( * ) Notice: Subject to any disclaimer, the term of this patent is extended or adjusted under 35 U.S.C. 154(b) by 350 days.

(21) Appl. No.: 17/536,258

(22) Filed: Nov. 29, 2021

(65) Prior Publication Data

US 2022/0085863 A1    Mar. 17, 2022

Related U.S. Application Data

(60) Division of application No. 16/665,284, filed on Oct. 28, 2019, now Pat. No. 11,190,265, which is a
(Continued)

(30) Foreign Application Priority Data

Apr. 28, 2017 (EP) ..................... 17168791

(51) Int. Cl.
| | | |
|---|---|---|
| H04B 7/08 | (2006.01) | |
| H04B 7/06 | (2006.01) | |
| H04L 27/26 | (2006.01) | |

(52) U.S. Cl.
CPC ........... *H04B 7/086* (2013.01); *H04B 7/0617* (2013.01); *H04B 7/0897* (2013.01); *H04L 27/2634* (2013.01); *H04L 27/2636* (2013.01)

(58) Field of Classification Search
CPC .... H04B 7/086; H04B 7/0617; H04B 7/0897; H04B 7/0413; H04B 7/0404;
(Continued)

(56) References Cited

U.S. PATENT DOCUMENTS

| | | |
|---|---|---|
| 2003/0087674 A1 | 5/2003 | Li et al. |
| 2007/0164902 A1 | 7/2007 | Bang et al. |

(Continued)

FOREIGN PATENT DOCUMENTS

| | | |
|---|---|---|
| JP | 2002543436 A | 12/2002 |
| JP | 2004120536 A | 4/2004 |

(Continued)

OTHER PUBLICATIONS

ISA/EP, International Search Report and Written Opinion, Jul. 18, 2019, re PCT International Patent Application No. PCT/EP2018/060381.

(Continued)

*Primary Examiner* — Charles C Jiang
*Assistant Examiner* — Shawn D Miller

(57) ABSTRACT

An apparatus includes an antenna array having a plurality of antennas. The antenna array is configured to receive a multi-carrier signal from a multi-antenna transmitter over a radio channel. The multi-carrier signal has at least two subcarriers, and each subcarrier is mapped at the transmitter to a respective subcarrier-beamformer. The respective subcarrier-beamformers has non-identical null and beam cone directions. A processor is configured to identify a communication direction for a radio signal communication between the apparatus and the transmitter. The communication direction is identified based on one or more specular path components of the radio channel which are related to a null or to a maximum of a subcarrier-beamformer.

11 Claims, 8 Drawing Sheets

Related U.S. Application Data continuation of application No. PCT/EP2018/060381, filed on Apr. 23, 2018.

(58) Field of Classification Search
CPC . H04B 7/0456; H04B 7/0671; H04L 27/2634; H04L 27/2636; H04L 27/2628
See application file for complete search history.

(56) References Cited

U.S. PATENT DOCUMENTS

| | | |
|---|---|---|
| 2007/0285315 A1 | 12/2007 | Davis et al. |
| 2008/0181174 A1 | 7/2008 | Cho |
| 2009/0080560 A1 | 3/2009 | Na et al. |
| 2009/0270118 A1 | 10/2009 | Jin et al. |
| 2009/0323777 A1 | 12/2009 | Wang et al. |
| 2011/0019573 A1 | 1/2011 | Ezri |
| 2013/0077660 A1 | 3/2013 | Ko et al. |
| 2013/0107733 A1 | 5/2013 | Yin |
| 2013/0294537 A1 | 11/2013 | Cha et al. |
| 2014/0146697 A1 | 5/2014 | Kim et al. |
| 2016/0119798 A1* | 4/2016 | Gil ............... H04W 64/003 370/252 |
| 2016/0277132 A1 | 9/2016 | Pratt et al. |
| 2017/0034812 A1 | 2/2017 | Deng et al. |
| 2017/0134203 A1 | 5/2017 | Zhu et al. |
| 2018/0213414 A1* | 7/2018 | Be ............... H04B 1/3822 |
| 2019/0058513 A1* | 2/2019 | Mizusawa ........ H04B 7/0617 |

FOREIGN PATENT DOCUMENTS

| | | |
|---|---|---|
| JP | 2013165519 A | 8/2013 |
| JP | 2014099861 A | 5/2014 |
| JP | 2014528185 A | 10/2014 |
| JP | 2017038197 A | 2/2017 |
| KR | 20030007955 A | 1/2003 |
| KR | 20070057429 A | 6/2007 |
| KR | 20080058805 A | 6/2008 |
| RU | 2366044 C1 | 8/2009 |

OTHER PUBLICATIONS

IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band, in IEEE Std 802.11ad-2012 (Amendment to IEEE Std 802.Nov. 2012, as amended by IEEE Std 802.11ae-2012 and IEEE Std 802.11aa-2012) , vol., No., pp. 1-628, Dec. 28, 2012 Retrieved from the Internet: URL: https://ieeexplore.ieee.org/stampPDF/getPDF.jsp?tp=&arnumber=6392842.

3rd Generation Partnership Project, Technical Specification Group Radio Access Network, Evolved Universal Terrestrial Radio Access (E-UTRA), Multiplexing and channel coding (Release 13), Mar. 2016, 3GPP TS 36.212 v13.1.0, pp. 1-129.

* cited by examiner

SPECULAR COMPONENT ESTIMATION IN A WIRELESS COMMUNICATION NETWORK

CROSS-REFERENCES TO RELATED APPLICATIONS

This application is a continuation of copending U.S. application Ser. No. 16/665,284, filed Oct. 28, 2019, which is a continuation of copending International Application No. PCT/EP2018/060381, filed Apr. 23, 2018, which is incorporated herein by reference in its entirety, and additionally claims priority from European Application No. EP 17 168 791.6, filed Apr. 28, 2017, which is incorporated herein by reference in its entirety.

BACKGROUND OF THE INVENTION

The present invention relates to the field of mobile communication networks and, more specifically, to approaches allowing for a reliable communication between respective entities of a mobile communication network, for example a reliable communication between a base station and a mobile device or another user equipment (UE) of the mobile communication network, or between a plurality of base stations of the mobile communication network, or between a plurality of mobile devices of the mobile communication network.

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ are connected to the core network 102 via respective backhaul links $114_1$ to $114_5$, which are schematically represented in FIG. 1 by the arrows pointing to the "core". The core network 102 may be connected to one or more external networks.

The wireless communication system may be any single-tone or multicarrier system based on frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate in accordance with LTE and 5G/NR (new radio).

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink control channel (PDCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number subframes of predefined length, e.g., 2 subframes with a length of 1 millisecond. Each subframe may include two slots of 6 or 7 OFDM symbols depending on the cyclic prefix (CP) length.

In a mobile communication network as it is, for example, depicted in FIG. 1, a wireless mobile communication between a base station BS and a user terminal or user equipment UE uses a radio channel. The radio channel may contain a direct path, also referred to as a line-of-sight (LoS) path, and/or one or more reflected paths, also referred to as non-line-of-sight (NLoS) paths. The paths are also referred to as components. FIG. 2 is a schematic representation of the respective paths of a radio channel for a mobile communication between a base station and a UE in accordance with an example. The base station BS may be one of the base stations shown in FIG. 1 serving the UE within the cell defined by the BS. Inside the cell a number of obstacles $200_1$ and $200_2$ may exist, for example buildings, trees, hills or mountains. The communication between the base station BS and the UE uses a radio channel 200 which, in the example depicted in FIG. 2, includes both a LoS path 202 as well as a plurality of NLoS paths 204a, 204b. The first NLoS path 204a includes a first segment $204a_1$ extending from the base station BS to the first obstacle $200_1$, and a second segment $204a_2$ extending from the first obstacle $200_1$ to the UE. In other words, a signal transmitted in the radio channel 200 by the BS in the direction towards the first obstacle $200_1$ is reflected at the obstacle and also received at the UE. Likewise, the second NLoS path 204b includes a first segment $204b_1$ extending from the base station BS to the second obstacle $200_2$ and a second segment $204b_2$ extending from the second obstacle $200_2$ to the UE.

The BS may be equipped with multiple antennas and multiple transmit/receive signal processing chains and may also be referred to as a massive MIMO (Multiple Input Multiple Output) BS. The BS may simultaneously direct one or more transmit beams or energy in a plurality of different directions, and may simultaneously receive one or more beams or energy from a plurality of different directions. The UE may also include multiple antennas and multiple transmit/receive chains, for example at least two antennas and transmit/receive chains, which enable the UE to transmit/receive beams or energy in/from a plurality of different directions. Such a UE is also referred to as a MIMO UE. Assuming two antennas having an appropriate spacing, the UE may generate a first direction per half-plane in/from which a signal to be transmitted/received is strongest, and a second, distinct direction per half-plane in/from which no transmission/reception of a signal is possible. The second direction is also referred to as the Null direction.

For a reliable communication, it is desired to use the strongest components or paths of the radio channel for the wireless communication. For example, when considering a wireless transmission in the downlink from the BS to the UE, the BS feeds transmit energy in the specific directions which lead to the UE, and the UE may perform a spatial signal processing, such as beam forming/maximum ratio combining or MIMO multiplexing, using its multiple antennas to extract the transmitted information. In the example depicted in FIG. 2, the BS may feed the transmit energy along the LoS and NLoS paths 202, 204 towards the UE. The strongest components/paths result from the LoS path and from specular reflections. Vice versa, in an uplink communication from the UE towards the BS, the UE sends energy or beams in the specific directions using the multiple antennas, and the BS receives energy or beams from the specific directions by adapting the multiple antennas of the BS accordingly.

To allow for a reliable communication the BS and UE need to have knowledge about the strongest components or paths of the radio channel to allow for correctly adapting the multiple antennas of the BS/UE to these paths. In accordance with conventional approaches as they are used, for example, in FD-MIMO (full dimension MIMO), the (non)-precoded CSI-RS (channel state information-reference signals) may be used to estimate the radio channel between the BS and the UE to select the best, suitable or desired beamformer per UE in the downlink (DL) direction. However, this involves estimating the frequency/time domain signals which may not be accurate enough and may include substantial calculating overhead.

SUMMARY

According to an embodiment, an apparatus may have: an antenna array having a plurality of antennas, the antenna array configured to receive a multi-carrier signal from a multi-antenna transmitter over a radio channel, wherein the multi-carrier signal has at least two subcarriers, each subcarrier mapped at the transmitter to a respective subcarrier-beamformer, the respective subcarrier-beamformers having non-identical null and beam cone directions, and a processor configured to identify a communication direction for a radio signal communication between the apparatus and the transmitter, wherein the communication direction is identified based on one or more specular path components of the radio channel which are related to a null or to a maximum of a subcarrier-beamformer.

According to another embodiment, an apparatus may have: an antenna array having a plurality of antennas, the antenna array configured to transmit a multi-carrier signal having at least two subcarriers to a receiver over a radio channel, and a processor configured to map each subcarrier of the multi-carrier signal to a respective subcarrier-beamformer, the respective subcarrier-beamformers having non-identical null and beam cone directions, wherein, responsive to a signal from the receiver identifying a communication direction for a radio signal communication between the apparatus and the transmitter, the processor is configured to calculate a radio signal beamformer according to the identified communication direction.

According to another embodiment, an apparatus may have: an antenna array having a plurality of antennas, the antenna array configured to receive a multi-carrier signal from a transmitter over a radio channel, wherein the multi-carrier signal hs at least two subcarriers, each subcarrier mapped at the transmitter to a respective subcarrier-beamformer, the respective subcarrier-beamformers having non-identical null and beam cone directions, and a processor configured to identify one or more dominant specular path components of the radio channel which are related to a null or to a maximum of the subcarrier-beamformer, and to signal the transmitter to adjust the subcarrier-beamformer such that one or more dominant path components in the multi-carrier signal are removed.

According to another embodiment, a system may have: a transmitter including an apparatus having an antenna array having a plurality of antennas, the antenna array configured to receive a multi-carrier signal from a multi-antenna transmitter over a radio channel, wherein the multi-carrier signal has at least two subcarriers, each subcarrier mapped at the transmitter to a respective subcarrier-beamformer, the respective subcarrier-beamformers having non-identical null and beam cone directions, and a processor configured to identify a communication direction for a radio signal communication between the apparatus and the transmitter, wherein the communication direction is identified based on one or more specular path components of the radio channel which are related to a null or to a maximum of a subcarrier-beamformer; or an apparatus having an antenna array having a plurality of antennas, the antenna array configured to receive a multi-carrier signal from a transmitter over a radio channel, wherein the multi-carrier signal hs at least two subcarriers, each subcarrier mapped at the transmitter to a respective subcarrier-beamformer, the respective subcarrier-beamformers having non-identical null and beam cone directions, and a processor configured to identify one or more dominant specular path components of the radio channel which are related to a null or to a maximum of the subcarrier-beamformer, and to signal the transmitter to adjust the subcarrier-beamformer such that one or more dominant path components in the multi-carrier signal are removed; and a receiver including an apparatus having an antenna array having a plurality of antennas, the antenna array configured to transmit a multi-carrier signal having at least two subcarriers to a receiver over a radio channel, and a processor configured to map each subcarrier of the multi-carrier signal to a respective subcarrier-beamformer, the respective subcarrier-beamformers having non-identical null and beam cone directions, wherein, responsive to a signal from the receiver identifying a communication direction for a radio signal communication between the apparatus and the transmitter, the processor is configured to calculate a radio signal beamformer according to the identified communication direction.

According to another embodiment, a method may have the steps of: receiving a multi-carrier signal from a transmitter over a radio channel, wherein the multi-carrier signal has at least two subcarriers, each subcarrier mapped at the transmitter to a respective subcarrier-beamformer, the respective subcarrier-beamformers having non-identical null and beam cone directions, and identifying a communication direction for a radio signal communication between the apparatus and the transmitter, wherein the communication direction is identified based on one or more specular path components of the radio channel which are related to a null or to a maximum of a subcarrier-beamformer.

According to another embodiment, a method may have the steps of: transmitting a multi-carrier signal having at least two subcarriers to a receiver over a radio channel, wherein each subcarrier of the multi-carrier signal is mapped to a respective subcarrier-beamformer, the respective subcarrier-beamformers having non-identical null and beam cone directions, and responsive to a signal from the receiver identifying a communication direction for a radio signal communication between the apparatus and the transmitter, calculating a radio signal beamformer according to the identified communication direction.

According to another embodiment, a method may have the steps of: receiving, at a receiver, a multi-carrier signal from a transmitter over a radio channel, wherein the multi-carrier signal has at least two subcarriers, each subcarrier mapped at the transmitter to a respective subcarrier-beamformer, the respective subcarrier-beamformers having non-identical null and beam cone directions, identifying, at the receiver, one or more dominant specular path components of the radio channel which are related to a null or to a maximum of the subcarrier-beamformer, and signaling to the transmitter to adjust the subcarrier-beamformer such that one or more dominant path components in the multi-carrier signal is removed.

Another embodiment may have a non-transitory digital storage medium having a computer program stored thereon to perform the method having the steps of: receiving a multi-carrier signal from a transmitter over a radio channel, wherein the multi-carrier signal has at least two subcarriers, each subcarrier mapped at the transmitter to a respective subcarrier-beamformer, the respective subcarrier-beamformers having non-identical null and beam cone directions, and identifying a communication direction for a radio signal communication between the apparatus and the transmitter, wherein the communication direction is identified based on one or more specular path components of the radio channel which are related to a null or to a maximum of a subcarrier-beamformer, when said computer program is run by a computer.

Another embodiment may have a non-transitory digital storage medium having a computer program stored thereon to perform the method having the steps of: transmitting a multi-carrier signal having at least two subcarriers to a receiver over a radio channel, wherein each subcarrier of the multi-carrier signal is mapped to a respective subcarrier-beamformer, the respective subcarrier-beamformers having non-identical null and beam cone directions, and responsive to a signal from the receiver identifying a communication direction for a radio signal communication between the apparatus and the transmitter, calculating a radio signal beamformer according to the identified communication direction, when said computer program is run by a computer.

Another embodiment may have a non-transitory digital storage medium having a computer program stored thereon to perform the method having the steps of: receiving, at a receiver, a multi-carrier signal from a transmitter over a radio channel, wherein the multi-carrier signal has at least two subcarriers, each subcarrier mapped at the transmitter to a respective subcarrier-beamformer, the respective subcarrier-beamformers having non-identical null and beam cone directions, identifying, at the receiver, one or more dominant specular path components of the radio channel which are related to a null or to a maximum of the subcarrier-beamformer, and signaling to the transmitter to adjust the subcarrier-beamformer such that one or more dominant path components in the multi-carrier signal is removed, when said computer program is run by a computer.

In accordance with embodiments, the present invention provides an apparatus, like a base station or a user equipment, which comprises an antenna array having a plurality of antennas, wherein the antenna array is configured to receive a multi-carrier signal from a multi-antenna transmitter, like a UE or a BS, over a radio channel. The multi-carrier signal has at least two subcarriers, each subcarrier being mapped at the transmitter to a respective subcarrier-beamformer. The respective subcarrier-beamformers have non-identical Null and beam cone directions. The apparatus comprises a processor to identify a communication direction for a radio signal communication between the apparatus and the transmitter, and the communication direction is identified based on one or more specular path components of the radio channel which are related to a Null or to a maximum of a subcarrier-beamformer.

In accordance with the inventive approach, rather than estimating the received signals, the strongest paths, also referred to as the most dominant multi-path components, in a MIMO communication link are implicitly extracted. In contrast to conventional approaches, it is not needed to estimate the frequency/time domain signals, rather the specular components in the radio channel are obtained which are used to derive appropriate transmission and reception techniques, for example transmit and receive beamformers, interference coordination and handover. In accordance with embodiments, the apparatus may be the base station and the transmitter may be the user equipment. In other examples, the apparatus may be the user equipment and the transmitter may be another user equipment, in case of a device to device (D2D) communication, or it may be the base station. Considering the example of the apparatus being the base station, in accordance with embodiments of the inventive approach, the BS determines the communication direction to be used for a later radio signal communication between the BS and the UE based on path components of the radio channel related to a Null or a maximum of the beamformer for a subcarrier of the multi-carrier signal provided by the transmitter, like the UE.

In accordance with embodiments, the present invention provides an apparatus, like the UE, comprising an antenna array having a plurality of antennas. The antenna array is configured to transmit a multi-carrier signal having at least two subcarriers to a receiver, like the BS, over a radio channel. A processor is provided which is configured to map each subcarrier of the multi-carrier signal to a respective subcarrier-beamformer, wherein the respective sub-carrier-beamformers have non-identical Null and beam cone directions. Responsive to a signal from the receiver identifying a communication direction for a radio signal communication between the apparatus and the transmitter, the processor is configured to calculate a radio signal beamformer according to the identified communication direction.

In accordance with examples, the apparatus may be the UE and the receiver may be the BS, or it may be another UE in case of a D2D communication. In accordance with this embodiment, when considering the apparatus to be a UE, the UE provides the multi-carrier signal for the communication with the BS. The BS, upon receiving the multi-carrier signal from the UE, determines a communication direction, for example using the inventive estimation approach, and provides a signal towards the UE indicating the identified communication direction and, on the basis of this signal, the UE calculates a radio signal beamformer, e.g. for an uplink (UL) communication from the UE to the BS.

The above described embodiments are advantageous as the desired communication direction or the most dominant multi-path components for the communication link are not identified on the basis of an estimation of the radio channel using the received frequency/time domain signals. Rather, the communication direction or path components in the radio channel are determined dependent on the characteristics of the subcarrier-beamformer at the transmitter, more specifically on the basis of whether specular components are related to a Null or a maximum thereof. This, eases the determination process and avoids complex calculation processes for estimating the radio channel.

In accordance with embodiments, the present invention provides an apparatus, like a BS, which comprises an antenna array, the antenna array configured to receive a multi-carrier signal from a transmitter, like a UE, over a radio channel. The multi-carrier signal has at least two subcarriers, each subcarrier mapped at the transmitter to a respective subcarrier-beamformer. The respective subcarrier-beamformers have non-identical Null and beam cone directions. The apparatus comprises a processor to identify one or more dominant specular path components of the radio channel which are related to a Null or to a maximum of the subcarrier-beamformer, and signals the transmitter to adjust the subcarrier-beamformer such that one or more dominant path components in the multi-carrier signal are removed.

In accordance with this embodiment, an extension of the dynamic range may be achieved as by removing the most dominant multipath components in the radio channel the apparatus is capable to receive or measure other spatial/specular components with a higher resolution. The apparatus may be the BS and the transmitter may be the UE. In accordance with other example, the apparatus may be the UE and the transmitter may be the BS, for example in the uplink communication between the UE and BS. The transmitter, however, may also be another UE in case of a D2D communication.

BRIEF DESCRIPTION OF THE DRAWINGS

Embodiments of the present invention will be detailed subsequently referring to the appended drawings, in which:

FIG. 3(*b*) schematically indicates two subcarrier-dependent beamformers that may be formed by the UE of FIG. 3(*a*) when using two of the antennas;

DETAILED DESCRIPTION OF THE INVENTION

Figure 1:
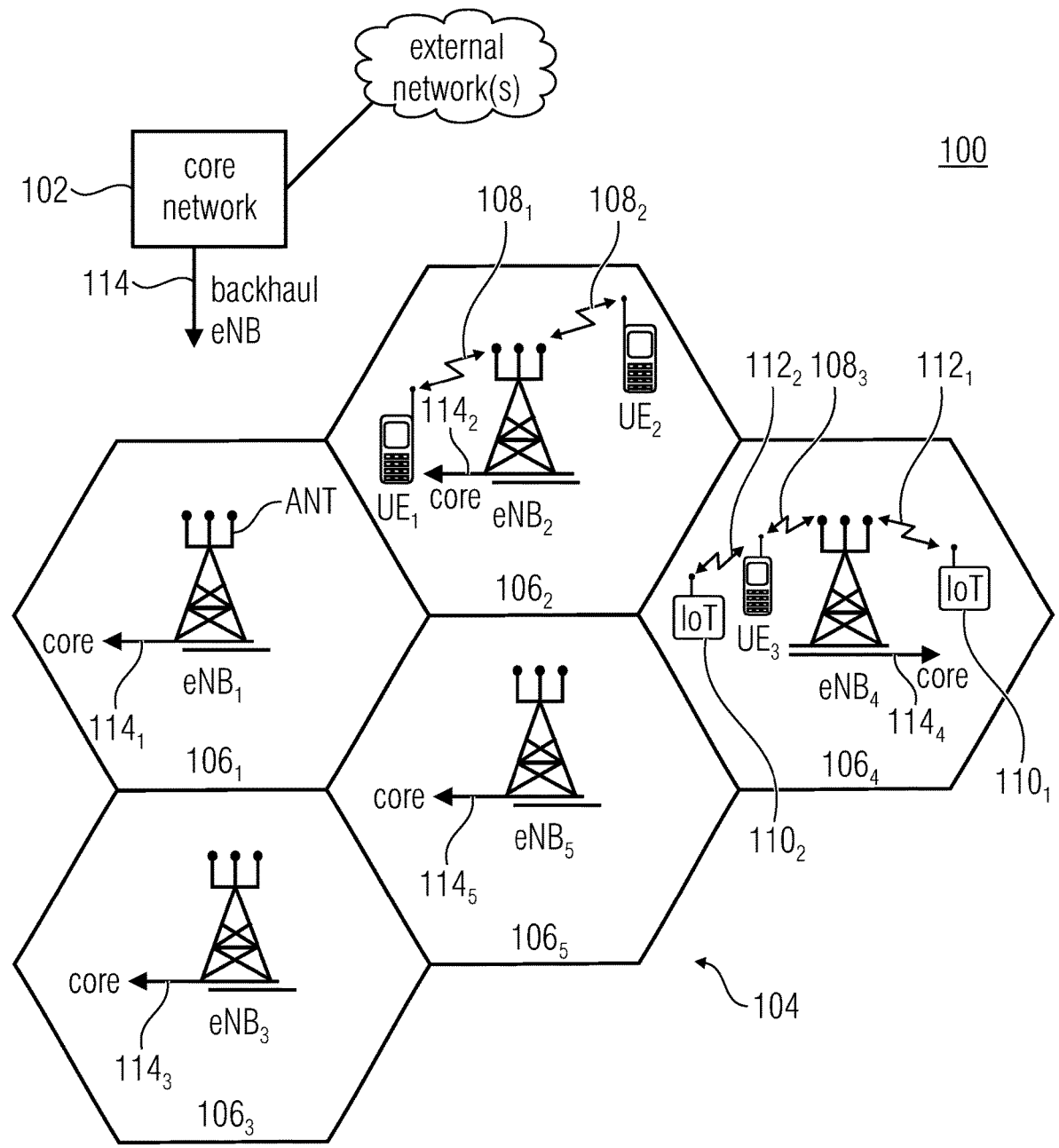
FIG. 1 shows a schematic representation of an example of the wireless network or wireless network infrastructure of the wireless communication system.
Figure 2:
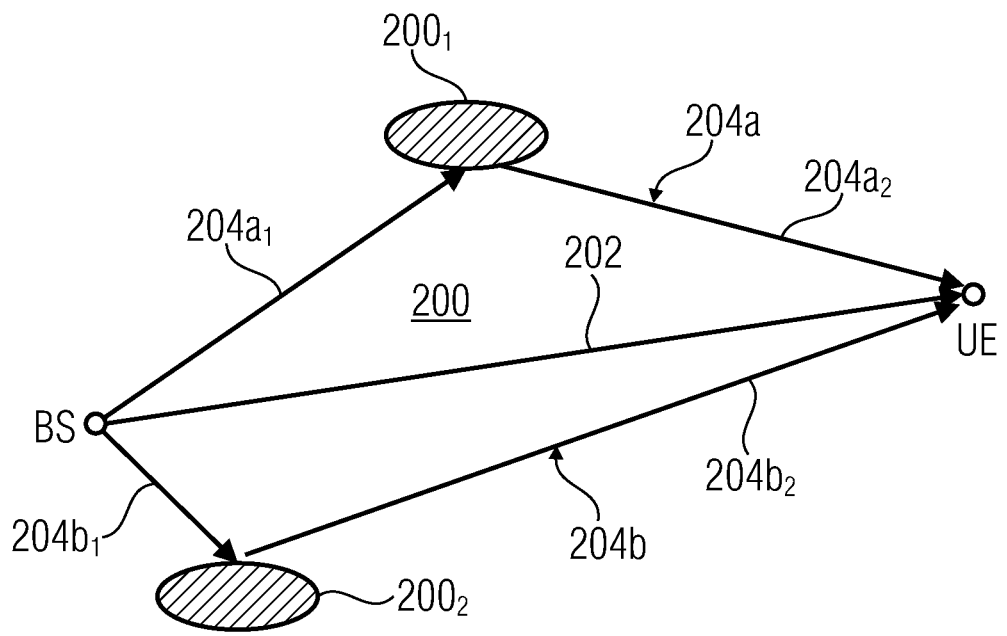
FIG. 2 is a schematic representation of respective paths of a radio channel for a mobile communication between a base station and a UE in accordance with an example.

In the following, embodiments of the present invention are described in further detail with reference to the enclosed drawings in which elements having the same or similar function are referenced by the same reference signs.

Embodiments of the inventive approach will now be described. A multi-carrier signal provided by a UE with a spatial coding may be used for the estimation of specular components useful for a reliable communication in an uplink (UL) communication between the UE and the BS.

FIG. 3(*a*) shows a schematic representation of a UE including a plurality of antennas $ANT_1$ to $ANT_3$ and a plurality of transmit/receive chains 206a to 206c. The BS may have a similar structure. The UE having the two or more than two antenna ports and the at least two transmit/receive chains 206a to 206c may select a set of two antennas, for example antennas $ANT_1$ and $ANT_2$, having a sufficient antenna spacing, for example an antenna spacing being below 0.8 lambda to ensure a single Null in the spatial domain. The UE may transmit a multi-carrier signal, for example a OFDM signal, for an uplink (UL) communication from the UE to a BS. Appropriate phase- and/or amplitude shifts may be applied before the signal is fed to each antenna port. These shifts may be subcarrier- and antenna-dependent such that each antenna port introduces a different delay in the time domain and amplitude weighting on the transmitted multi-carrier signal. In this way, separate subcarrier-dependent beamformers, also referred to as effective antenna array radiation patterns, are generated determining the directions in/from which energy is transmitted/received by the UE. In accordance with examples, the multi-carrier signal transmitted over the different antenna ports may have the following properties:

each subcarrier of the multi-carrier signal may be mapped to a narrowband beamformer, and the subcarrier-dependent beamformers may be orthogonal to each other in the spectral domain, however, they may overlap in the spatial domain.

In accordance with further embodiments, the shifts may be achieved by introducing a certain delay for different antenna ports, similar to cyclic-delay diversity (CDD) concepts. The base station may tell the UEs which delay is to be used.

In accordance with other embodiments, a large set of fixed beamformers may be generated, for example using the codebook, and the UEs may be informed of the subset to be used. For example, the codebook may be provided to define a specific change in a radiation direction per sub-carrier based on the available bandwidth. For example, for multiple symbols, like OFDM symbols, the mapping may be changed according to the codebook to help the BS to mitigate the effects of flat-fading or other sources of errors. In accordance with this embodiment, it is assumed that the selection of Null directions is derived from the defined codebooks which may be constructed in a similar way as in the case of CSI-RS, i.e., using DFT-based codebooks with specific oversampling in the annular domain. Due to the structure of Nulls in the annular domain, the oversampling factor may be increased. The oversampling factor may be signaled by the BS as a cell specific property or may be adapted if needed. The codebook may be a DFT-based codebook that may be constructed by truncating the first M rows of the MT-point DFT matrix $$c_\ell = \frac{1}{\sqrt{M}} \left[ 1 \; e^{-j2\pi\ell\frac{1}{MT}} \; e^{-j2\pi\ell\frac{2}{MT}} \; \ldots \; e^{-j2\pi\ell\frac{M-1}{MT}} \right]^T$$

Figure 3A:
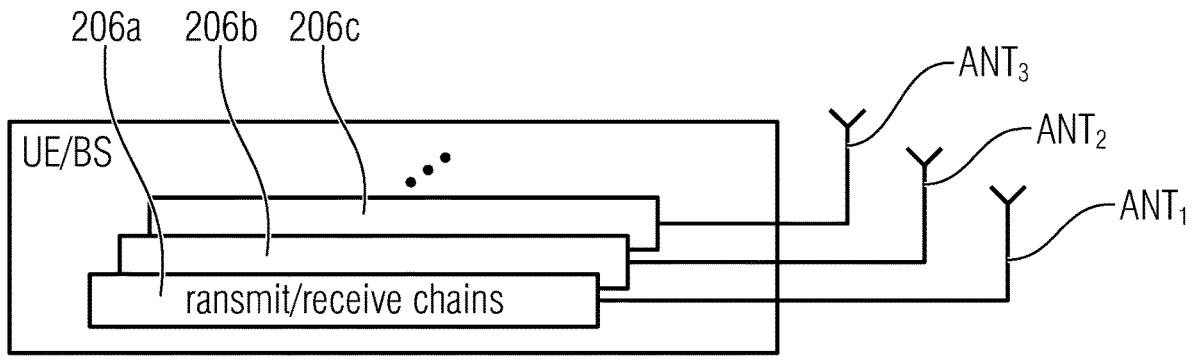
FIG. 3(*a*) shows a schematic representation of a UE or a BS including a plurality of antennas and a plurality of transmit/receive chains.
Figure 3B:
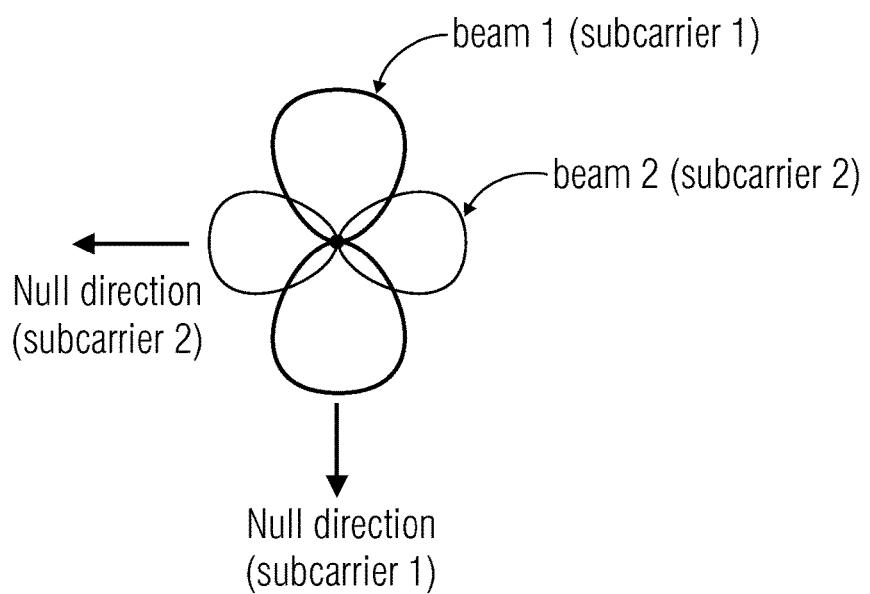

FIG. 3(b) schematically indicates two subcarrier-dependent beamformers that may be formed by the UE of FIG. 3(a) when using two of the antennas. The beamformers have non-identical Null directions and maximum beam cone directions. The Null directions and beam cone directions may be equally distributed in the spatial domain for a given/used signal bandwidth of the communication link between the BS and the UE. In accordance with other examples, the narrowband beam formers may be designed to cover only a specific spatial area of the whole spatial domain when applying appropriate phase- and amplitude weighting to each subcarrier signal.

Now embodiments for estimating the strongest or most dominant specular components for a communication between a BS and a UE will be described.

Figure 4:
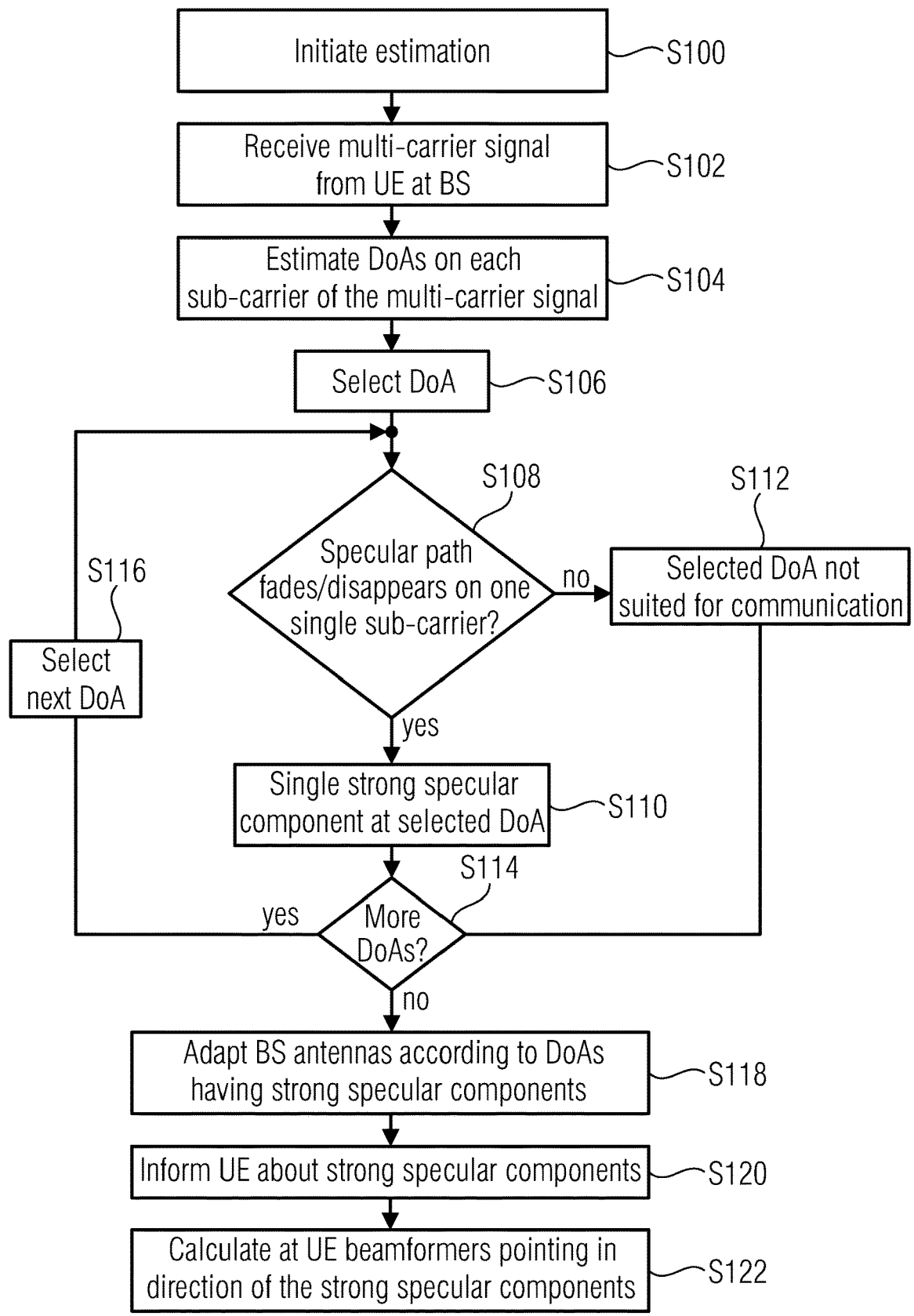
FIG. 4 is a flow diagram representing an embodiment of a process or method for estimating strong specular components of a UL channel between a BS and a UE based on DoAs.

FIG. 4 is a flow diagram representing an embodiment of a process or method for estimating strong specular components of the UL channel between the BS and the UE. This process is also referred to a sounding process or procedure.

The process starts at S100 at which the estimation procedure or sounding procedure is initiated. In accordance with examples, the estimation may be initiated by the BS, for example using a signalization channel between the BS and the UE, such as the PDCCH. In accordance with other examples, the estimation may be initiated by the UE asking the BS via a signalization channel, such as the physical uplink control channel (PUCCH), for approval to start with the estimation process.

As is depicted, for example, in FIG. 1, the BS may be equipped with multiple antennas, such as a massive MIMO antenna array. The BS, at S102, receives the multi-carrier signal from the UE via the radio channel. The UE generates the multi-carrier signal as has been described with reference to FIG. 3.

At S104 the BS performs a direction of arrival (DoA) estimation on each sub-carrier or jointly over all subcarriers of the channel path components. In accordance with examples, a parametric description of the radio channel is assumed and each specular path component may be described by the path-dependent parameters DoA and DoD (direction of departure).

At S106 a first of the estimated DoAs is selected and at S108 it is determined by the BS whether a channel component or a specular path related to the selected DoA $\alpha$ is fading or disappearing on one specific single sub-carrier. If the channel component/specular path related to the selected DoA $\alpha$ is fading/disappearing on one specific single sub-carrier at the BS, the beamformer, for example the narrowband beamformer, related to this specific subcarrier at the UE side is pointing its Null in exactly the direction of departure (DoD $\beta$) of this specular path component that may be described by the parameters $\alpha,\beta$. Due to the fading/disappearing channel component/specular path, the BS derives at S110 that the communication direction described by the DoA $\alpha$ at the BS and by the DoD $\beta$ at the UE includes only a single strong specular component.

In case it is determined at S108 that there is no single sub-carrier for which a specular path fades/disappears for the selected DoA, it is determined at S112 that the selected DoA is not suitable for a communication. For example, if for the selected DoA the signal disappears at the BS for multiple or all subcarriers, i.e., for multiple or all DoDs at the UE, this selected DoA is not suitable for the communication. Also, if for a given DoA the signal is present and no specific subcarrier exists at which the signal disappears or no such subcarrier may be identified at the BS, the corresponding DoA or communication path is considered a superposition of several multi-path/specular components that may not be distinguished in the angular domain at the BS and, therefore, this DoA is considered not suitable for the communication, like a data communication from the UE to the BS.

Once the selected DoA has been evaluated or processed in S108 to S112, at S114 it is determined whether all DoAs or a certain number of DoAs estimated at S104 have been evaluated or processed. In case one or more DoAs remain, the process selects at S116 a next DoA to be evaluated, and the S108 to S114 are repeated. Once processing of the DoAs is completed, the actual estimation phase terminates, and the BS knows the DoAs of the strong specular components of the UL channel and may adapt its multiple antennas for the communication accordingly, as is indicated at S118, for example for a UL data transmission from the UE towards the BS.

In accordance with further embodiments, the BS may signal to the UE the strong specular components, as is indicated at S120. For example, the BS may know the subcarrier indices of the strong specular components, which are related to specific Null directions-of-departure, at the UE side and this information may be transmitted to the UE at S120. Based on this knowledge, one or more beamformers, for example broadband beamformers, may be calculated at the UE side that point into the direction of the strong specular components, as is indicated at S122 in FIG. 4.

In accordance with the above described embodiment of the inventive approach, the BS may derive a set of suitable communication directions between the BS and the UE, and may calculate beamformers accordingly. The UE may also perform standard channel estimation and spatial receive beamforming, for example MMSE or ZF, to decode the signals for single and multi-stream reception.

Further embodiments of the inventive estimation or sounding procedure will now be described. In accordance with these embodiments, at the BS, the received signal energy is estimated for determining a communication direction for a communication from the UE to the BS. In accordance with examples, the UE may be equipped with a large number of antennas so that each subcarrier may be mapped to a single ultra-narrow or sharp beam in which the signal energy is highly concentrated in the main beam pointing direction. In such examples, each beam cone may be associated with (a) a single specular path component, or
(b) very few channel path components, or
(c) no path component.

The subcarrier-dependent beam cones may have non-identical beam pointing directions that may be equally distributed in the spatial domain for a given/used signal bandwidth of the communication link between the BS and the UE. In accordance with other examples, the beam cones may be designed to cover only a specific spatial area of the whole spatial domain.

Figure 5:
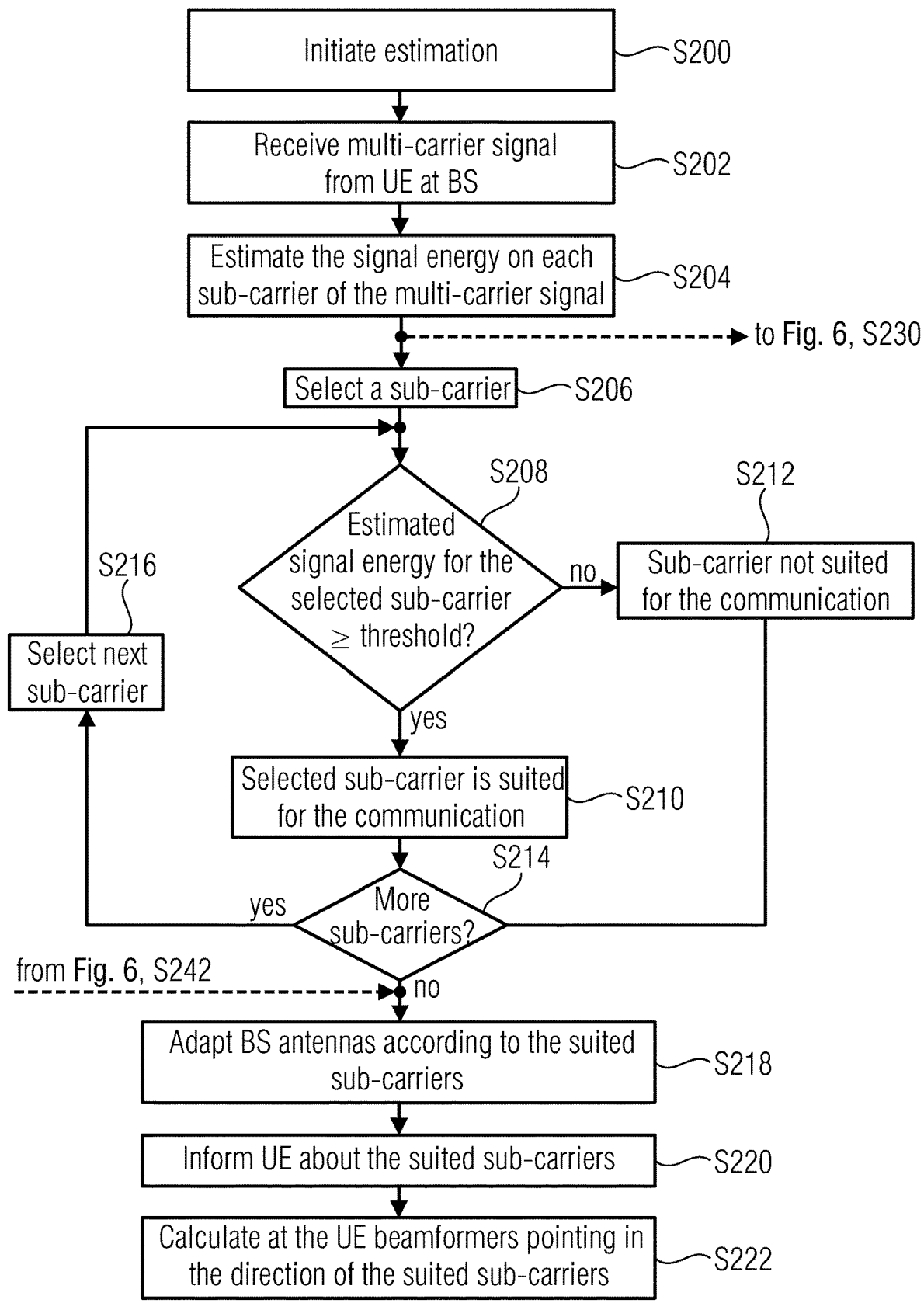
FIG. 5 shows a flow diagram of the process for the estimation of the communication direction between the BS and the UE in accordance with an embodiment of the inventive approach based on signal energy estimates.

FIG. 5 shows a flow diagram of the process for the estimation of the communication direction between the BS and the UE in accordance with an embodiment of the inventive approach. At S200, the estimation process is initiated, for example in a similar way as explained above with respect to the process at S100 in FIG. 4.

At S202, the BS receives the multi-carrier signal from the UE via the radio channel. The UE may generate the multi-carrier signal in a way as described above with reference to FIG. 3 or by providing the above mentioned high number of antennas for forming sharp beams.

In accordance with this embodiment, the BS performs a signal energy detection on the subcarriers. At S204, the BS estimates the signal energy on each of the subcarriers of the multicarrier signal received from the UE, and selects at S206 one of the subcarriers.

At S208 the BS determines whether the estimated energy for the selected subcarrier equals or is above a predefined threshold. In case the estimated energy is greater than the threshold, it is determined at S210 that the subcarrier is suited for a communication. More specifically, if sufficient signal energy is detected on a subcarrier, the beamformer of this specific subcarrier at the UE side is pointing its energy in the direction of one or more than one specular path components, and the BS derives that for the corresponding direction one or more than one specular path components exist that may be exploited for the communication, like the data communication, between the BS and the UE.

In case it is determined at S206 that the estimated energy on the selected subcarrier is below the predefined threshold, it is determined at S212 that the subcarrier is not suitable for the data communication. More specifically, in case the BS detects that on the selected subcarrier there is no significant signal energy, the corresponding DoD at the UE side are not suitable for the data communication.

At S214, it is determined whether all or a certain number of subcarriers have been processed and, in case non-processed or non-evaluated subcarriers remain, another subcarrier is selected at S216 and the estimation at S206 to S212 is repeated.

After the estimation phase, the BS knows the subcarrier indices of the strong specular components and may adapt its antennas accordingly, as is indicated at S218, in a similar way as described above with reference to FIG. 4 at S118.

In accordance with further embodiments, the information about the strong specular path components may be signaled or fed back to the UE, as indicated at S220 and the UE may adapt the UE antennas for the data transmission accordingly, as is indicated at S222. For example, the UE may form a single or multiple beams, for example broadband beams, that are steered into the directions of the specular channel path components indicated by the signal received at the UE from the BS.

Figure 6:
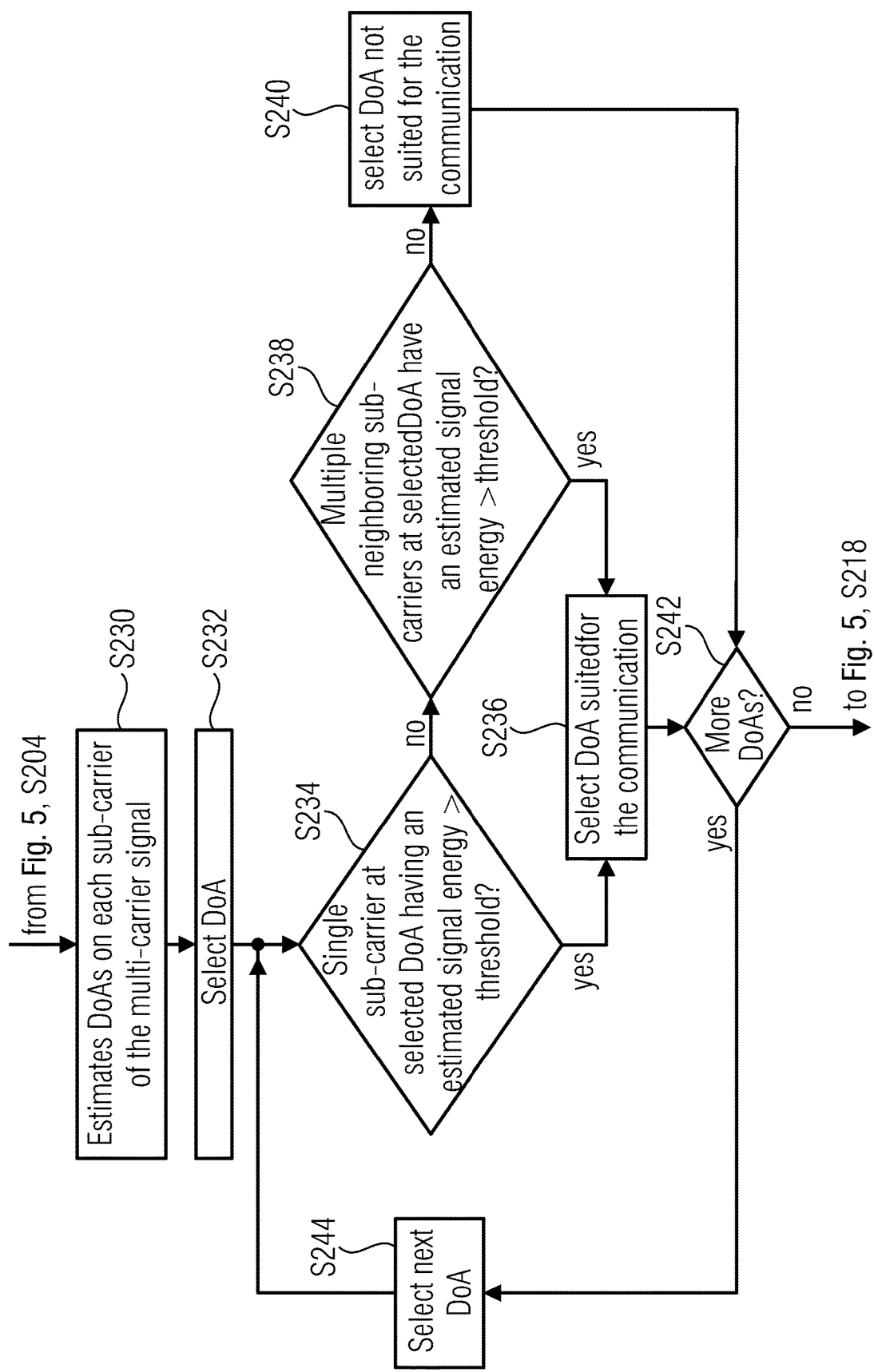
FIG. 6 shows a flow diagram of the process for the estimation of the communication direction between the BS and the UE in accordance with an embodiment of the inventive approach based on signal energy estimates and DoAs.

In accordance with further embodiments, the BS may also perform a DoA estimation on the subcarriers using the multiple antennas of the BS. The DoA estimation may be performed instead of or in addition to the signal energy detection described above with reference to FIG. 5. FIG. 6 is a flow diagram depicting the process for the DoA estimation performed by the BS on each subcarrier in accordance with this embodiment.

The process in FIG. 6 includes initiating the estimation, receiving the multi-carrier signal at the BS and the estimation of the signal energy on each subcarrier as described with reference to FIG. 5 at S202 to S204.

At S230, the BS estimates the DoAs on each sub-carrier and selects a DoA at S232.

At S234 it is determined as to whether there is a single sub-carrier having an estimated signal energy which is equal to or above a predefined first threshold. In case such a single sub-carrier exists, it is determined at S236 that one or more than one specular path component is suited for the communication. More specifically, if for the selected DoA α, which may be related to one or more than one channel component/specular path, sufficient energy is detected on a single sub-carrier, the beamformer of this specific subcarrier at the UE side is pointing its signal energy in exactly the direction of departure (DoD) β of the specular path components. The BS derives that the communication direction described by the DoA α at the BS and the DoD β at the UE includes one or more than one specular path component that may be exploited for the communication between the BS and the UE.

In case there is no single sub-carrier having an estimated signal energy above the first threshold, it is determined at S238 whether for the selected DoA α, which is related to one or more than one channel component/specular path components, there is sufficient signal energy on multiple neighboring sub-carriers, i.e., whether multiple neighboring sub-carriers have a signal energy above a second threshold. The second threshold may be the same as the first threshold or it may be different from the first threshold. In case this is true, the respective components are considered suitable for communication as indicated at S236. Otherwise, the selected DoA is considered not suitable for communication as indicated at S240. In other words, when for a specific DoA α, which is related to one or more than one channel component/specular path components, sufficient signal energy is detected on multiple neighboring sub-carriers, the corresponding beamformers at the UE side are pointing their signal energy in the direction of the respective specular path components which may be exploited for the data communication.

Following the evaluation/processing of the selected DoA, at S242 it is determined whether all DoAs or a certain number of DoAs estimated at S230 have been evaluated or processed. In case there are DoAs remaining which need to be evaluated/processed, the next DoA selected at S244 and the estimation is repeated at S234 to S240.

After the estimation phase, the BS knows the subcarrier indices as well as the DoAs of the strong specular path components of the radio channel and, as described with reference to FIG. 5, at S218 the BS may adapt it antennas accordingly. Also, as indicated at S220, this information may be fed back to the UE which may adapt its multiple antennas for the data transmission accordingly, for example the UE may form a single or multiple beams, like broadband beams, that are steered into the directions of the specular channel path components indicated by the UE, as indicated at S222. Further, the BS may derive a set of suitable communication directions between the BS and the UE.

In accordance with embodiments, the sounding procedure, e.g. a UL sounding, may be implemented through a scanning-Null over time/frequency resources. For example, each sub-carrier may be mapped to an effective beamformer at the UE containing a single Null per half space. The whole spatial domain may be covered with a set of available resources/subcarriers.

In accordance with other embodiments, the sounding procedure may be implemented through a beamformer/Null design. For example, the subcarrier-dependent beamformers containing a single Null at the UE side may be designed to cover a specific angular region of the whole angular domain with a higher density. In this way, the BS may identify specular path components in specific angular regions with an increased resolution.

In accordance with yet further embodiments, the sounding procedure may be implemented using Null scanning with more than two UE antennas. In case the UE is equipped with M antennas, each possible beamformer may place M-1 Nulls in specific directions. The subcarrier-dependent beamformers may be designed to point M-2 Nulls in known directions such that, for example, unwanted strong multipath or LoS path components are removed, and only desired strong specular paths remain in the radio channel. The BS is able to measure the DoAs of the remaining path components with a higher accuracy. In accordance with this embodiment M>2 transmitter/receiver chains 206 (see FIG. 3(a)) at the UE are assumed which allows to remove additional specular components by setting multiple, i.e., M-1, Nulls. In particular, the UE may place M-2 static or fixed Nulls in a desired direction while another Null may be used to scan the angle domain as described in the embodiments above. The placement of the static/fixed Nulls may be arranged jointly between the UE and the corresponding BS, i.e., there may be additional signalization/feedback messages exchanged between the two entities. In accordance with other examples, the placement of the static/fixed Nulls may be performed autonomously by the UE.

In accordance with embodiments, the channel sounding/estimation may be performed using data transmission. For example, standard references signals may be used and may be encoded in the transmitted signal, more specifically, the multicarrier signal provided by the UE to the BS for the estimation process may include standard reference signals encoded in the multicarrier signal. In other words, the specular component estimation may be performed on the standard reference signals, i.e. in a form of beamformed CSI-RS or DMRS (DeModulation Reference Signal') in the uplink direction.

In accordance with other examples, the PUSCH may be allowed to carry payload data which is possible because the channel estimation procedure is changed such that the individual/independent specular components are estimated. Assuming that a modulation and coding scheme (MCS) is chosen in a robust manner, for example by using multiple MCS levels, an error-free decoding of the payload at the BS may be ensured even if the signal-to-interference-plus-noise ratio (SINR) is not maximized at the BS for the given data.

In the embodiments described above regarding the signalizing of the specular components by the BS to the UE, for example at steps S116 and S216 in FIG. 4 and FIG. 5, in accordance with embodiments, the BS may signal the subcarrier indices. As mentioned above, the BS determines the set of independent specular components and informs the UE on which subcarriers the desired components disappeared or where sufficient energy on a single carrier or on neighboring carriers was available. In accordance with other embodiments, the BS may signal the desired angles of departure (AoDs) at the UE. The BS may obtain the corresponding transmit directions for the UE and signal the set of angles to the UE.

In accordance with further embodiments, a rank indication for the UL/DL communication per single link may be performed. Based on an analysis of the independent specular components the BS may give a maximum number s in the amount of loaded data streams which is less than min (receive antennas, transmit antennas, s).

Figure 7:
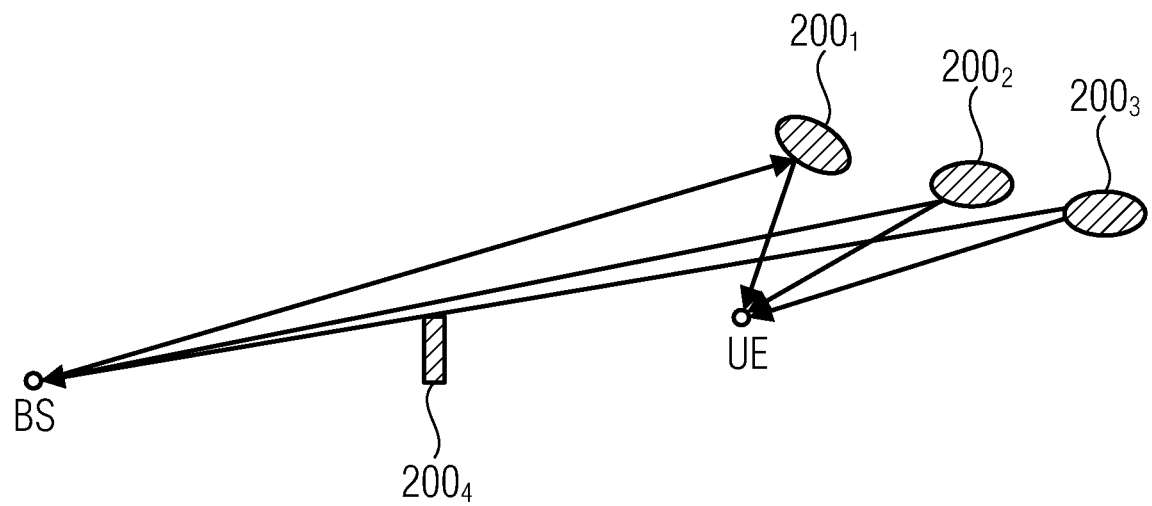
FIG. 7 is a schematic representation of the path components of the radio channel selected by a BS for a downlink communication following the communication direction estimation in a way as described above with regard to the embodiments of FIG. 3 to FIG. 6.

In the embodiments described above, the communication direction for an uplink communication from the UE to the BS has been described, however, the estimated communication direction may equally be used for a downlink communication from the BS to the UE. FIG. 7 is a schematic representation for a downlink communication, more specifically for the path components of the radio channel selected by a BS for a downlink communication following the communication direction estimation in a way as described above with regard to the embodiments of FIG. 3 to FIG. 6. As may be seen in FIG. 7, the BS has no direct path to the UE and, on the basis of the estimation which may be performed in accordance with the above described embodiments, three directions for the downlink communication to the UE, all of which are NLoS paths, are used.

In accordance with further embodiments, a spatial multiplexing may be based on the specular components estimated in accordance with the above described embodiments. For example, the knowledge of the independent specular components may be used to feed individual data streams to the UE in order to serve the UE in spatial multiplexing mode with a minimum of transmit antennas and a minimum of independent specular components. The sounding/estimation may be based on two antennas.

Although the above described embodiments have been described in the context of a communication between a BS and a UE, it is noted that the inventive approach is not limited to such embodiments. Also for a device to device communication, for example between two UEs, and the communication direction may be estimated on the basis of the above described principles. In accordance with further embodiments, also for a communication among two or more base stations, the communication direction may be estimated on the basis of the above described principles.

In accordance with another aspect of the inventive approach, a dynamic range extension for the estimation process may be implemented by the base station. The base station may initiate an additional measurement mode by telling the UE having two or more antennas to set a single Null, as it may be determined by the embodiment described with reference to FIG. 3 and FIG. 4, such that the direct or LoS component is removed and only the remaining multipath components remain. In this specific case, the LoS component was a dominant component and, due to the removal of this dominant component, the BS is now capable to receive and measure other spatial/specular components with a higher resolution, e.g., due to the adaption of an automatic gain control (AGC) at the BS. A similar mechanism may be used for dominant multipath components and once these multipath components, which are dominant, have been identified, the BS may trigger the UE to set a single Null in this specific direction to allow for a processing of the remaining components with a higher resolution.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 8:
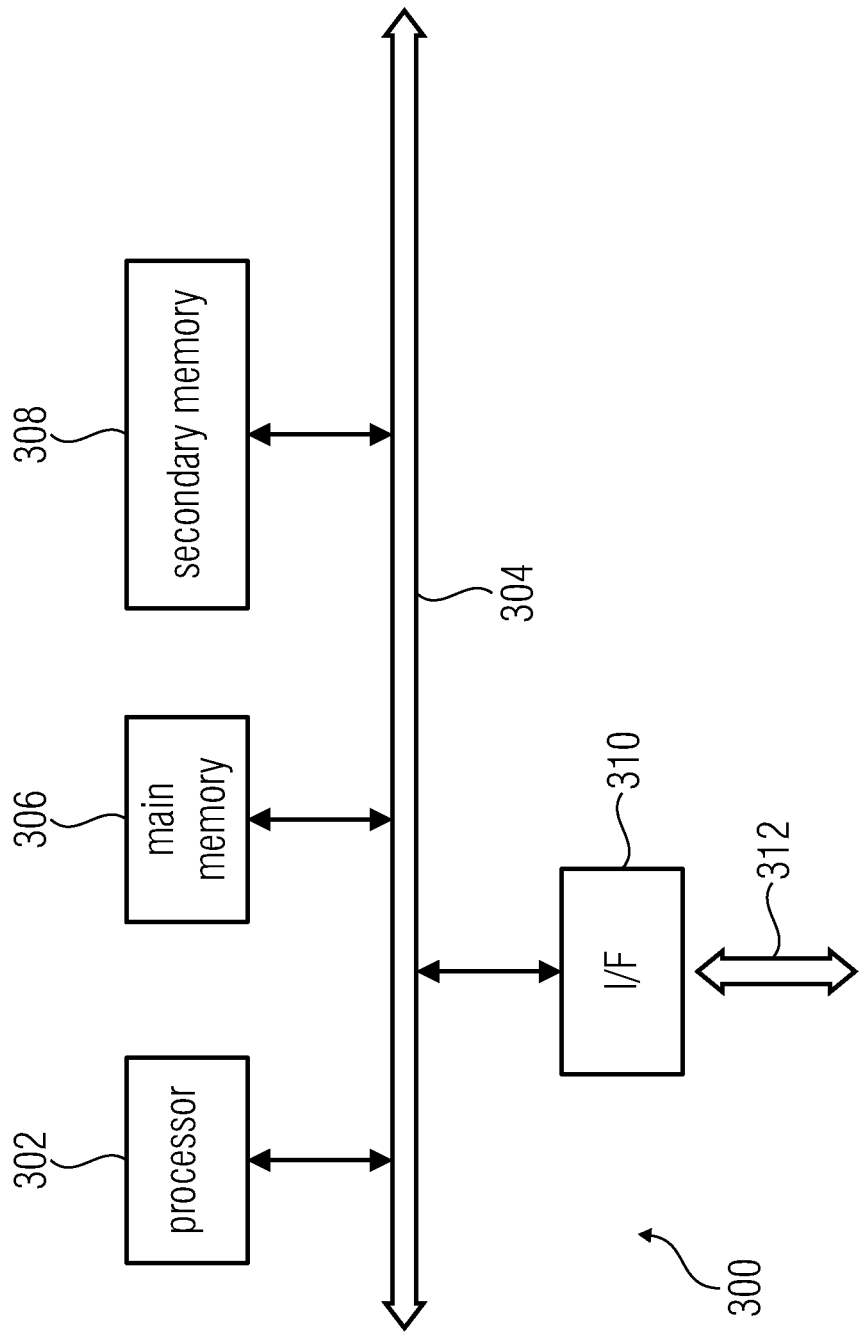
FIG. 8 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 300. The units or modules as well as the steps of the methods performed by these units may execute on one or more computer systems 300. The computer system 300 includes one or more processors 302, like a special purpose or a general purpose digital signal processor. The processor 302 is connected to a communication infrastructure 304, like a bus or a network. The computer system 300 includes a main memory 306, e.g., a random access memory (RAM), and a secondary memory 308, e.g., a hard disk drive and/or a removable storage drive. The secondary memory 308 may allow computer programs or other instructions to be loaded into the computer system 300. The computer system 300 may further include a communications interface 310 to allow software and data to be transferred between computer system 300 and external devices. The communication may be in the form electronic, electromagnetic, optical, or other signals capable of being handled by a communications interface. The communication may use a wire or a cable, fiber optics, a phone line, a cellular phone link, an RF link and other communications channels 312.

The terms "computer program medium" and "computer readable medium" are used to generally refer to tangible storage media such as removable storage units or a hard disk installed in a hard disk drive. These computer program products are means for providing software to the computer system 300. The computer programs, also referred to as computer control logic, are stored in main memory 306 and/or secondary memory 308. Computer programs may also be received via the communications interface 310. The computer program, when executed, enable the computer system 300 to implement the present invention. In particular, the computer program, when executed, enable processor 302 to implement the processes of the present invention, such as any of the methods described herein. Accordingly, such a computer program may represent a controller of the computer system 300. Where the disclosure is implemented using software, the software may be stored in a computer program product and loaded into computer system 300 using a removable storage drive, an interface, like communications interface 310.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-antenna device, comprising:
   an antenna array,
      wherein the antenna array comprises a plurality of antennas,
      wherein the antenna array is arranged to receive a multi-carrier signal,
      wherein the multi-carrier signal is received from a second multi-antenna device,
      wherein the multi-carrier signal is received over a radio channel,
      wherein the multi-carrier signal comprises at least two subcarriers,
      wherein each of the at least two subcarriers is mapped at the second multi-antenna device to a respective subcarrier-beamformer, and
   a processor circuit,
      wherein the processor circuit configured to identify at least one communication direction,
      wherein the at least one communication direction is for a radio signal communication, wherein the radio signal communication is between the multi-antenna device and the second multi-antenna device, wherein the at least communication direction is identified based on at least one specular path component of the radio channel, wherein the at least one specular path component is related to one of the subcarrier-beamformers, wherein the processor circuit is arranged to:
  detect a signal energy of the at least one specular path component of the radio channel on each of the subcarriers, and
  when the detected signal energy is greater than or equal to a first threshold on a first subcarrier among the subcarriers, identify as the at least one communication direction for the radio signal communication a direction into which the subcarrier-beamformer of the first subcarrier points its signal energy, and wherein the processor circuit is arranged to:
  signal to the second multi-antenna device the identified communication direction, wherein signaling the at least one communication direction to the second multi-antenna device allows the second multi-antenna device to calculate a radio signal beamformer according to the at least one communication direction, or
  calculate the radio signal beamformer according to the at least one communication direction.

2. The multi-antenna device of claim 1, wherein the processor circuit is arranged to identify a second direction to be unsuitable for the radio signal communication when a detected signal energy is below a second threshold for a second subcarrier, wherein the second subcarrier points its signal energy into the second direction.

3. The multi-antenna device, of claim 1, wherein the signal energy being greater than or equal to the first threshold indicates that the signal energy is pointed in a direction of a maximum of a subcarrier-beamformer at the second multi-antenna device.

4. The multi-antenna device of claim 1, wherein the processor circuit is arranged to initiate the identification of the communication direction:
  by signaling to the second multi-antenna device to start transmitting the multi-carrier signal, or
  based on a signal from the second multi-antenna device.

5. The multi-antenna device of claim 4, wherein the signaling from the second multi-antenna device uses a physical downlink control channel, and wherein the signaling to the second multi-antenna device uses a physical uplink control channel.

6. The multi-antenna device of claim 1, wherein:
  the processor circuit is arranged to signal to the second multi-antenna device the at least one communication direction, and
  the processor circuit is arranged to:
    signal subcarrier information to the second multi-antenna device,
      wherein the subcarrier information indicates subcarriers on which the detected signal energy was greater than or equal to the first threshold, or
    obtain transmit directions for the second multi-antenna device, and signal to the second multi-antenna device a set of angles corresponding to the obtained transmit directions, or
    signal, dependent on an analysis of the specular path components of the radio channel, a maximum number of data streams to be used for the radio signal communication.

7. The multi-antenna device of claim 4, wherein the signaling from the second multi-antenna device uses a physical uplink control channel, and wherein the signaling to the second multi-antenna device uses a physical downlink control channel.

8. The multi-antenna device of claim 1, comprising a base station.

9. The multi-antenna device of claim 1, comprising a user device.

10. The multi-antenna device of claim 9, wherein the user device comprises a mobile device.

11. The multi-antenna device of claim 9, wherein the user device comprises an Internet-of-Things device.

* * * * *